United States Patent [19]
Svendsen et al.

[11] Patent Number: 5,662,339
[45] Date of Patent: Sep. 2, 1997

[54] INFANT FRAME CARRIER

[75] Inventors: Sean Svendsen, Columbus; Paul Kolada, Bexley; David J. Stroud, Dayton; Steve Courtney, Troy, all of Ohio

[73] Assignee: Lisco, Inc., Tampa, Fla.

[21] Appl. No.: 556,183

[22] Filed: Nov. 9, 1995

[51] Int. Cl.$^6$ ........................................... B62B 7/12
[52] U.S. Cl. .................... 280/30; 280/641; 280/648; 280/47.25; 224/153
[58] Field of Search ...................... 280/30, 38, 641, 280/642, 643, 644, 645, 647, 648, 651, 652, 47.24, 47.25; 224/153, 161

[56] References Cited

U.S. PATENT DOCUMENTS

| | | | |
|---|---|---|---|
| 3,984,115 | 10/1976 | Miller | 224/153 |
| 4,157,837 | 6/1979 | Kao | 280/30 |
| 4,487,428 | 12/1984 | Harada et al. | 280/648 |
| 4,586,721 | 5/1986 | Harada et al. | 280/30 |
| 4,718,715 | 1/1988 | Ho | 297/32 |
| 4,747,526 | 5/1988 | Launes | 224/155 |
| 4,762,256 | 8/1988 | Whitaker | 224/161 |
| 5,178,309 | 1/1993 | Bicheler et al. | 224/153 |
| 5,564,720 | 10/1996 | Stringer | 224/153 |

Primary Examiner—Richard M. Camby

[57] ABSTRACT

A child carrier for use as a two-wheeled stroller and as a child-supporting backpack comprising a frame formed of an upper handle component in an inverted U-shaped configuration and a lower component formed of two downwardly extending legs and a cross-piece coupling the legs at their lower ends with a bracket at the lower ends of the handle and the upper ends of the legs for coupling therebetween. A fabric seat for a child has a rear face coupled to the bracket. An upwardly extending back and a pair of vertical straps form a front. A forwardly-extending U-shaped restraint is positioned in front of a child and secured at its inboard ends to the bracket supporting the upper edge of the seat. A pair of wheels are rotatably secured to the lower end of the legs and a disk with a plurality of radial recesses rotatably secured with respect to the bracket and an associated rod axially reciprocable through the bracket with a spring resiliently urging the rod in a direction into one of the recesses and adapted to be pulled by a user to allow rotation of the upper handle.

7 Claims, 5 Drawing Sheets

5,662,339

INFANT FRAME CARRIER

BACKGROUND OF THE INVENTION

1. Field of the Invention

The present invention relates to an infant frame carrier and more particularly pertains to utilizing a child carrier either as a two-wheeled stroller or as a child-supporting backpack.

2. Description of the Prior Art

The use of strollers, backpacks and other child-supporting devices of various design are known in the prior art. More specifically, strollers, backpacks and other child-supporting devices and heretofore utilized for the purpose of supporting and transporting children through various methods and apparatuses are known to consist basically of familiar, expected and obvious structural configurations, notwithstanding the myriad of designs encompassed by the crowded prior art which have been developed.

By way of example, the prior art discloses in U.S. Pat. No. U.S. Pat. No. 4,157,837 to Kao, discloses a back and stroll carrier. U.S. Pat. No. 4,487,428 to Harada et al., discloses a convertible stroller. U.S. Pat. No. 4,586,721 to Harada et al., discloses a convertible stroller. U.S. Pat. No. 4,718,715 to Ho, discloses an adjustable folding baby chair. U.S. Pat. No. 4,747,526 to Launes, discloses a transportable infant seat. U.S. Pat. No. 4,762,256 to Whitaker, discloses a convertible stroller-backpack baby carrier.

In this respect, the child carrier according to the present invention substantially departs from the conventional concepts and designs of the prior art, and in so doing provides an apparatus primarily developed for the purpose of utilizing a child carrier either as a two-wheeled stroller or as a child-supporting backpack.

Therefore, it can be appreciated that there exists a continuing need for a new and improved child carrier which can be used either as a two-wheeled stroller or as a child-supporting backpack. In this regard, the present invention substantially fulfills this need.

SUMMARY OF THE INVENTION

In view of the foregoing disadvantages inherent in the known types of strollers, backpacks and other child-supporting devices now present in the prior art, the present invention provides an improved child carrier. As such, the general purpose of the present invention, which will be described subsequently in greater detail, is to provide a new and improved child carrier apparatus and method which has all the advantages of the prior art and none of the disadvantages.

To attain this, the present invention essentially comprises a new and improved child carrier for use as a two-wheeled stroller and as a child-supporting backpack comprising, in combination, a frame formed of an upper handle component in an inverted U-shaped configuration and a lower component formed of two downwardly extending legs and a cross-piece coupling the legs at their lower ends with a bracket at the lower ends of the handle and the upper ends of the legs for coupling therebetween. A fabric seat for a child has a rear face coupled to the bracket. An upwardly extending back and a pair of vertical straps form a front. A forwardly-extending U-shaped restraint is positioned in front of a child secured at its inboard ends to the bracket supporting the upper edge of the seat. A pair of wheels are rotatably secured to the lower end of the legs. A chest belt has a releasable buckle at a central extent secured to the frame at the lower cross-piece. A pair of shoulder straps are secured to the frame with their upper ends secured to the restraint and their lower ends secured to the frame adjacent to the cross-piece. Safety straps are coupled to the child seat for securing the child in position thereon. A disk with a plurality of radial recesses are rotatably secured with respect to the bracket and an associated rod axially reciprocable through the bracket with a spring resiliently urging the rod in a direction into one of the recesses and adapted to be pulled by a user to allow rotation of the upper handle between an upper orientation wherein the device may be used as a stroller and a lower orientation wherein the device may be used as a backpack.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other devices for carrying out the several purposes of the present invention. It is important, therefore, that the claims be regarded as including such equivalent constructions insofar as they do not depart from the spirit and scope of the present invention.

It is therefore an object of the present invention to provide a new and improved child carrier which has all the advantages of the prior art strollers, backpacks and other child-supporting devices and none of the disadvantages.

It is another object of the present invention to provide a new and improved child carrier which may be easily and efficiently manufactured and marketed.

It is a further object of the present invention to provide a new and improved child carrier which is of a safe, comfortable and convenient construction.

An even further object of the present invention is to convenience a child care provider by a single device which allows the support and movement of a juvenile, child or infant in any one of a plurality of modes.

Still yet another object of the present invention is to facilitate the transportation of small juvenile, children and infants by a child care provider either by carrying or by rolling.

Still another object of the present invention is to utilize a child carrier either as a two-wheeled stroller or as a child-supporting backpack.

Lastly, it is an object of the present invention to provide a new and improved child carrier for use as a two-wheeled stroller and as a child-supporting backpack comprising a frame formed of an upper handle component in an inverted U-shaped configuration and a lower component formed of two downwardly extending legs and a cross-piece coupling the legs at their lower ends with a bracket at the lower ends of the handle and the upper ends of the legs for coupling therebetween. A fabric seat for a child has a rear face coupled to the bracket. An upwardly extending back and a pair of vertical straps form a front. A forwardly-extending U-shaped restraint is positioned in front of a child and secured at its inboard ends to the bracket supporting the upper edge of the seat. A pair of wheels are rotatably secured to the lower end of the legs and a disk with a plurality of radial recesses rotatably secured with respect to the bracket and an associated rod axially reciprocable through the bracket with a spring resiliently urging the rod in a direction into one of the recesses and adapted to be pulled by a user to allow rotation of the upper handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
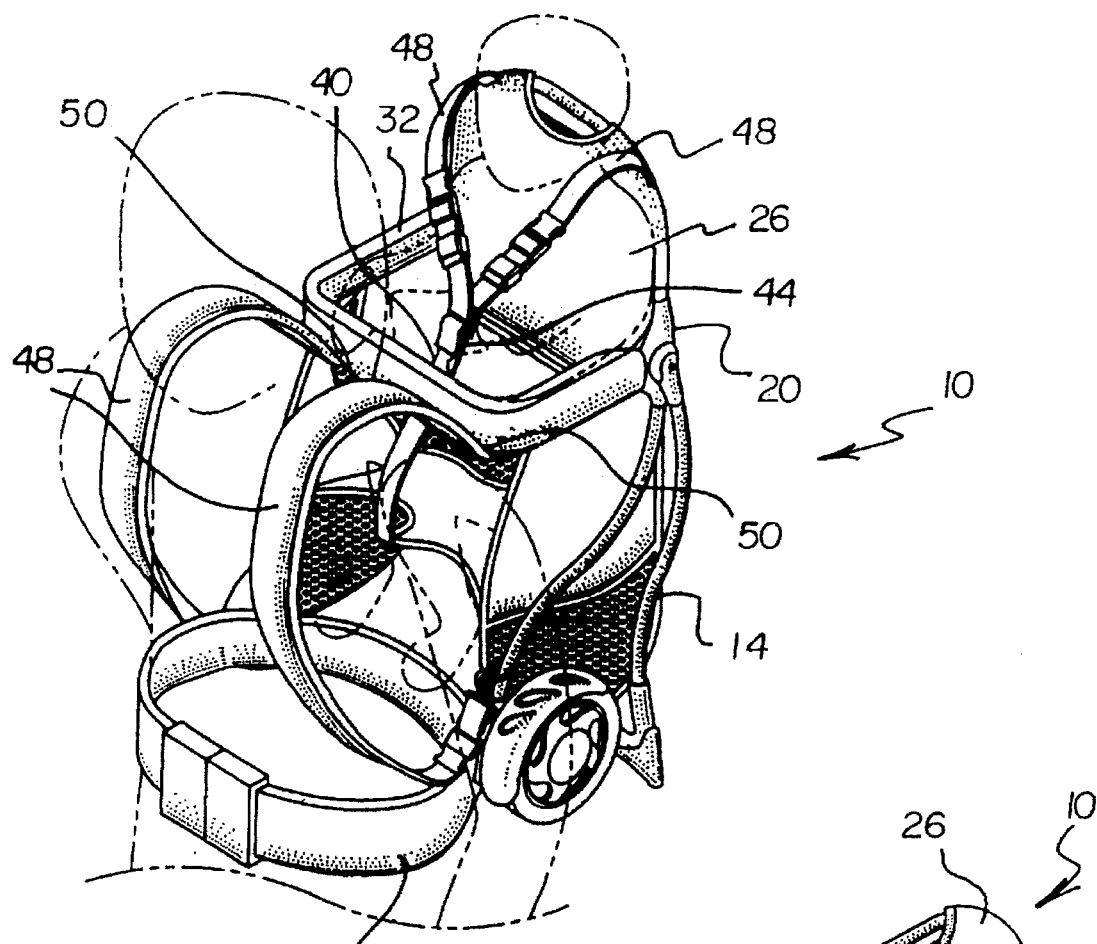
FIG. 1 is a perspective illustration of the preferred embodiment of the child carrier constructed in accordance with the principles of the present invention.
Figure 2:
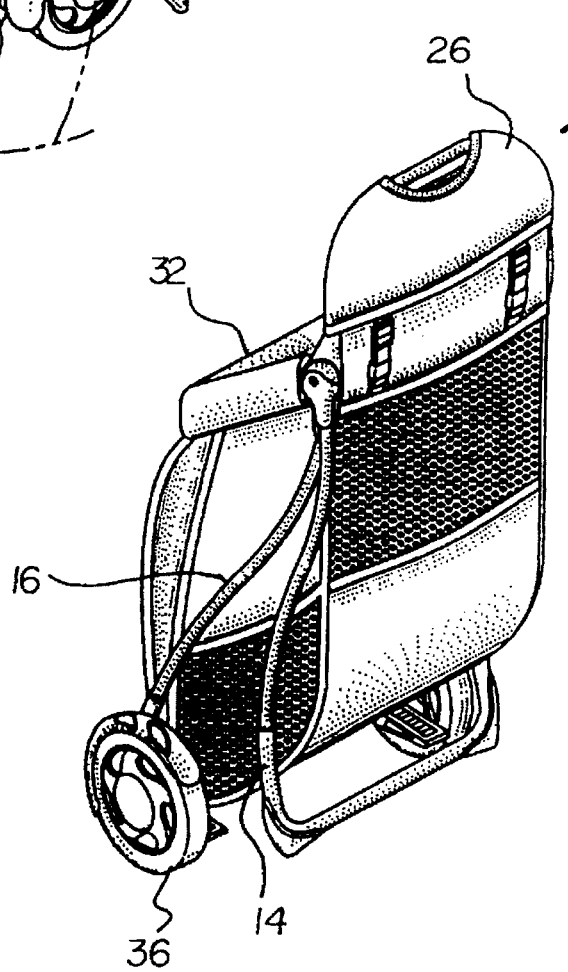
FIG. 2 is a perspective view of the device shown in FIG. 1 but taken from the rear side thereof.

With reference now to the drawings, and in particular to FIG. 1 thereof, the preferred embodiment of the new and improved child care product for use a two-wheeled stroller or as a child-supporting backpack embodying the principles and concepts of the present invention and generally designated by the reference numeral 10 will be described.

The present invention, the new and improved child care product for use a two-wheeled stroller or as a child-supporting backpack is comprised of a plurality of components. Such components in their broadest context include a frame, a fabric seat, a chest belt, a pair of wheels, a pair of shoulder straps and a pair of safety straps. Such components are individually configured and correlated with respect to each other so as to attain the desired objective.

More specifically, the present invention could be considered a system 10. The central component of the system is a frame 12. The frame is formed to include an upper handle component 14. Such handle component is in an inverted U-shaped configuration. In addition, the frame also includes a lower component formed of downwardly extending legs 16. At the lower end of the legs is a cross-piece 18 which couples the legs at their lower extents.

In addition to the handle component, legs and cross-piece, the frame also includes a bracket 20. The bracket is located at the lower ends of the handle and the upper ends of the legs. The function of the bracket is for coupling together the handle and legs.

Next provided in association with the frame is a fabric seat 22. The fabric seat is for supporting a child during operation and use. The seat includes a rear face 24. Such rear face is coupled to the bracket. The fabric seat also includes an upwardly extending back 26 and a pair of vertical straps 28. The vertical straps are parallel and spaced and form the front of the seat.

Support for the seat is provided by an upwardly extending U-shaped restraint 32. Such restraint is positioned in front of the child. It is secured at its inboard ends to the bracket. The restraint, in addition to providing safety to a child, also functions to support the upper edge of the fabric seat.

Utility is provided to the device when used as a stroller through the use of a pair of wheels 36. Such wheels are rotatably secured about a common horizontal axis. Such wheels in axis are located at the lower ends of the legs adjacent to the crosspiece.

In association with the seat there is provided a chest belt. The chest belt is of a generally conventional configuration as used in association with other child products. It includes a lower vertical strap 40 extending upwardly from the lower portion of the seat in the front of the crotch of the child and terminates in a buckle 42. Shoulder straps extend from the upper edge of the back to the upper end of the lower strap. Releasable fasteners 44 allow for separation of the straps for a child to be held in position or released from the seat.

In order to help the child care provider utilize the device when in a backpack mode, there is provided a pair of shoulder straps 48. Such shoulder straps are secured to the frame with their upper ends. Their upper ends 50 are secured to the restraint. Their lower ends are secured to the frame adjacent to the crosspiece.

In addition, a chest belt 54 is also utilized. Such chest belt is coupled to the seat and functions with the shoulder straps for securing the device to the child care provider when in the back pack mode.

The last component of the system 10 is a rotatable disk 58. Such disk is provided with a plurality of radial recesses. The disk is rotatably secured with respect to the bracket. In addition, an associated rod 60 is mounted for axial reciprocation through the back bracket above the disk. A spring 62 functions to resiliently urge the rod in a direction into one of the recesses. The recesses allow the handle to be oriented upwardly when the device is used as a stroller. The recesses also allow the handle to be pivoted downwardly when the device is used as a backpack. When in the lower position, the handle also functions as a point of rest for the device in association with the wheel.

Lastly, the recess selected may adapt the rod to be pulled by a user to allow rotation of the upper handle. Rotation is between and upper orientation wherein the device may be used as a stroller. Rotation is also to a lower orientation wherein the device may be used as a backpack.

Figure 3:
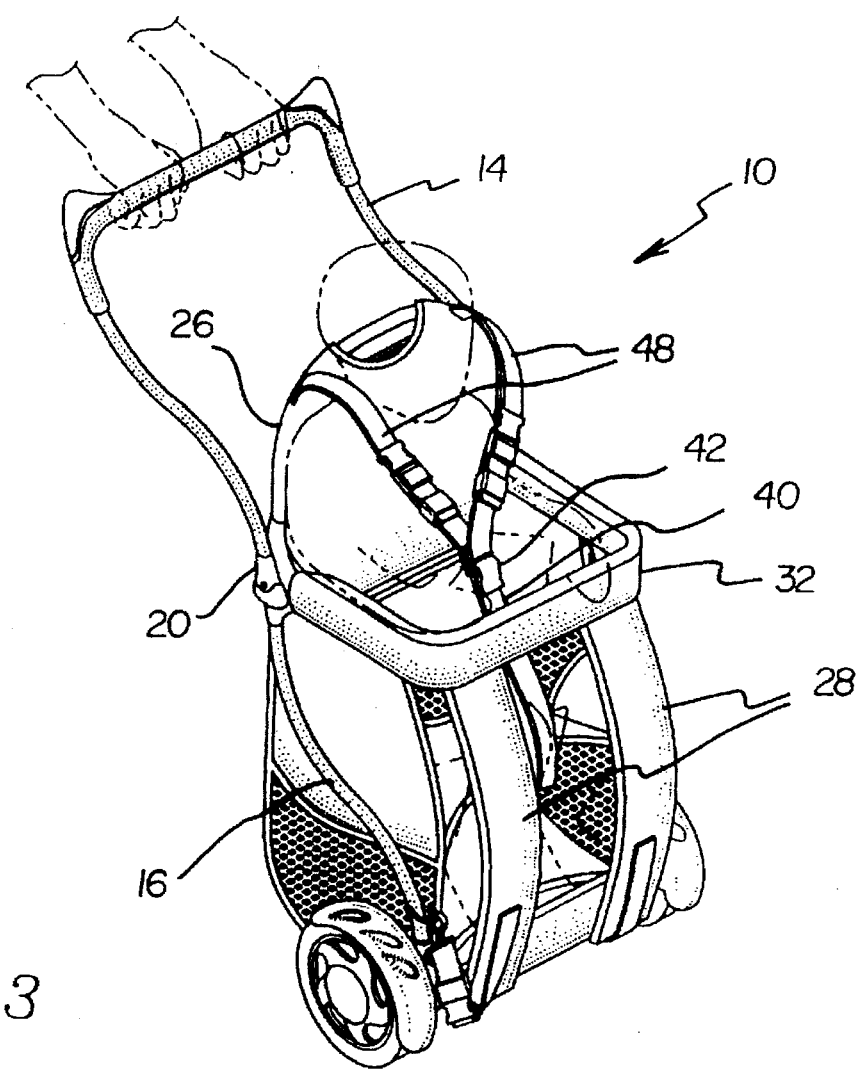
FIG. 3 is a perspective illustration of the front side of the device shown in the prior Figures.
Figure 4:
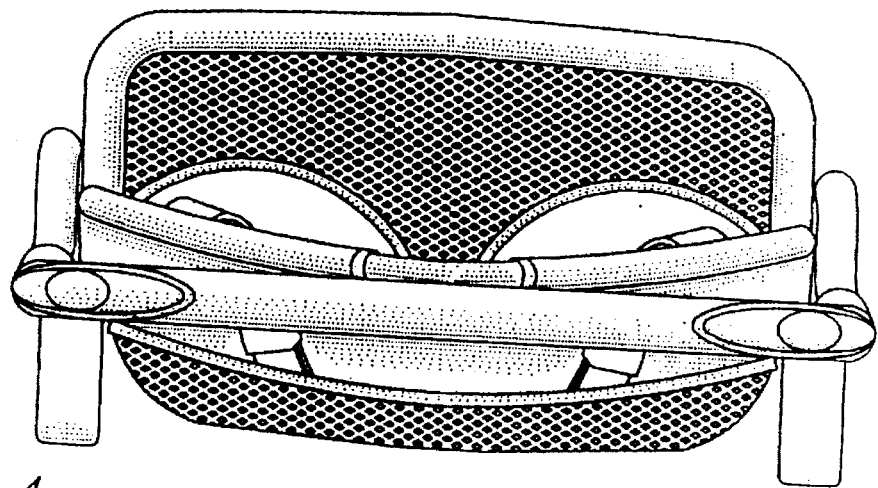
FIG. 4 is a top elevational view of the device shown in FIG. 3.
Figure 5:
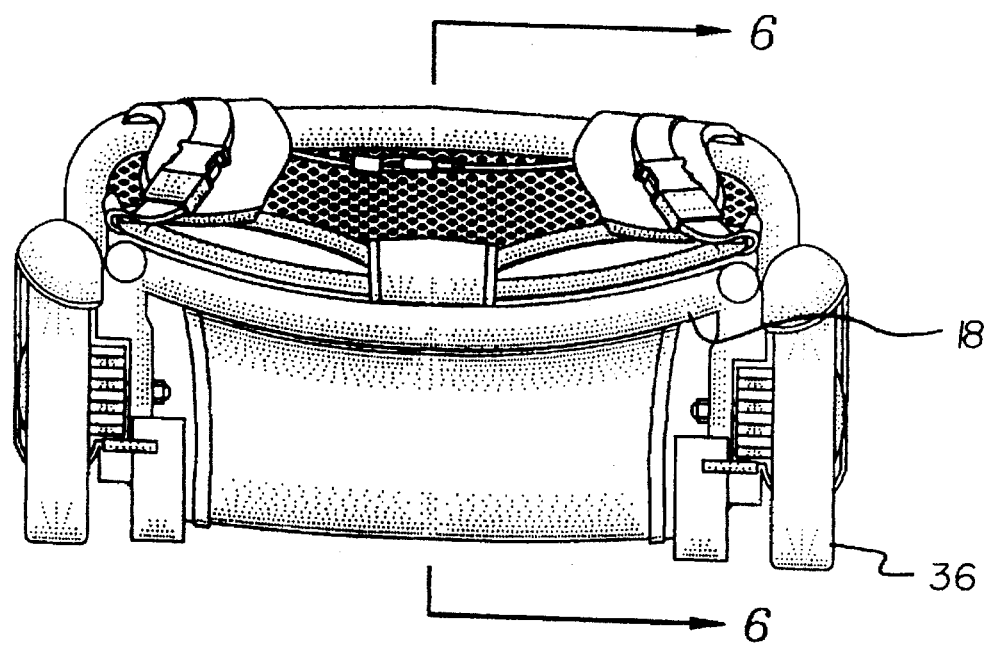
FIG. 5 is a bottom elevational view of the device shown in the prior Figures.
Figure 6:
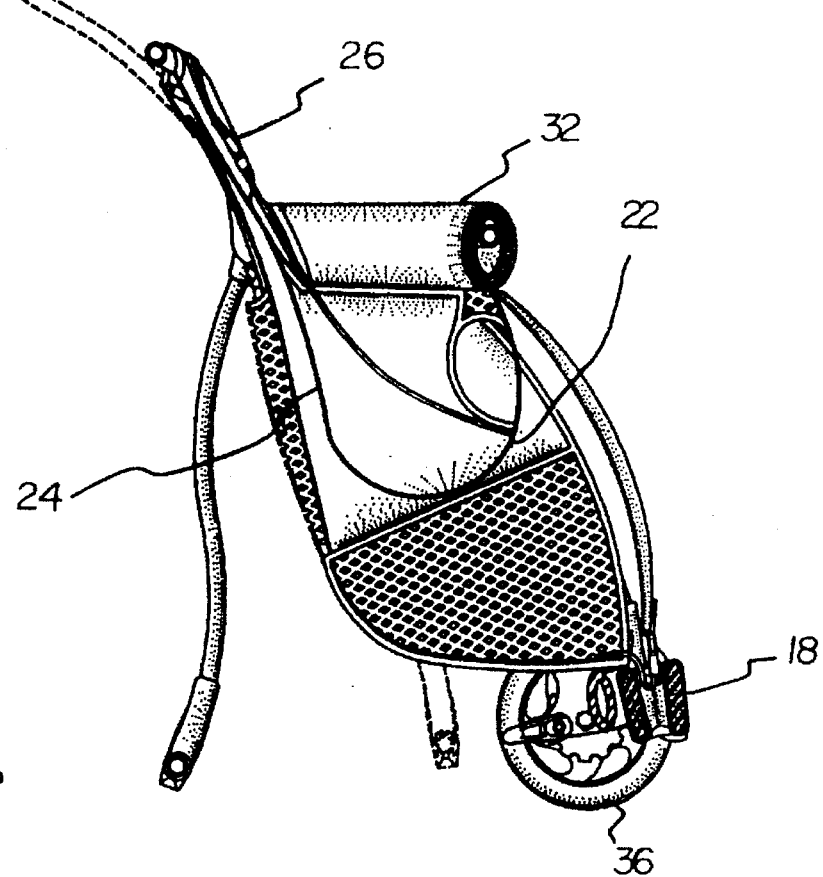
FIG. 6 is a cross-sectional view taken along line 6—6 of FIG. 5.
Figure 7:
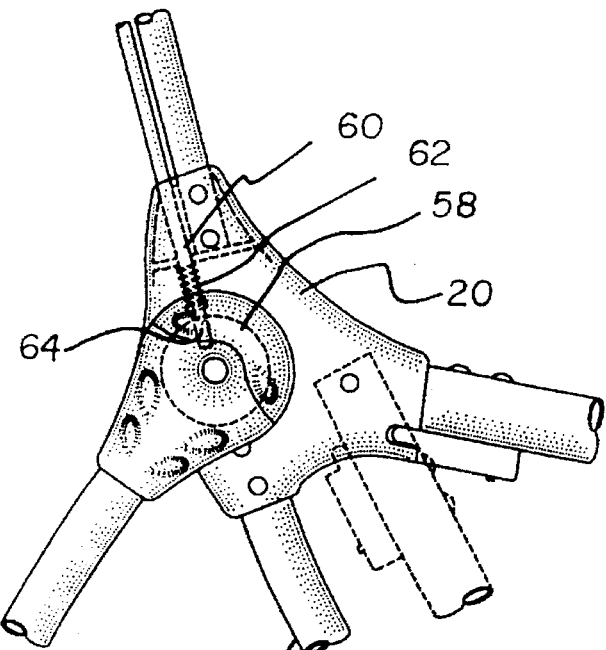
FIG. 7 is an enlarged elevational view of the hinge of the device shown the prior Figures.
Figure 8:
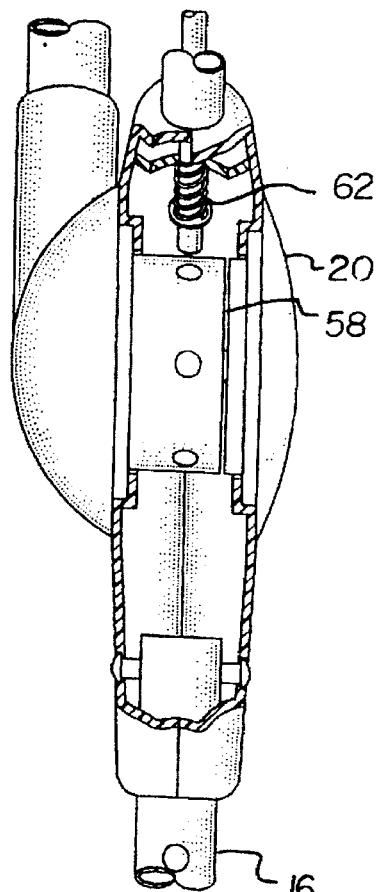
FIG. 8 is a cross-sectional view taken of the hinge shown in FIG. 7.
Figure 9:
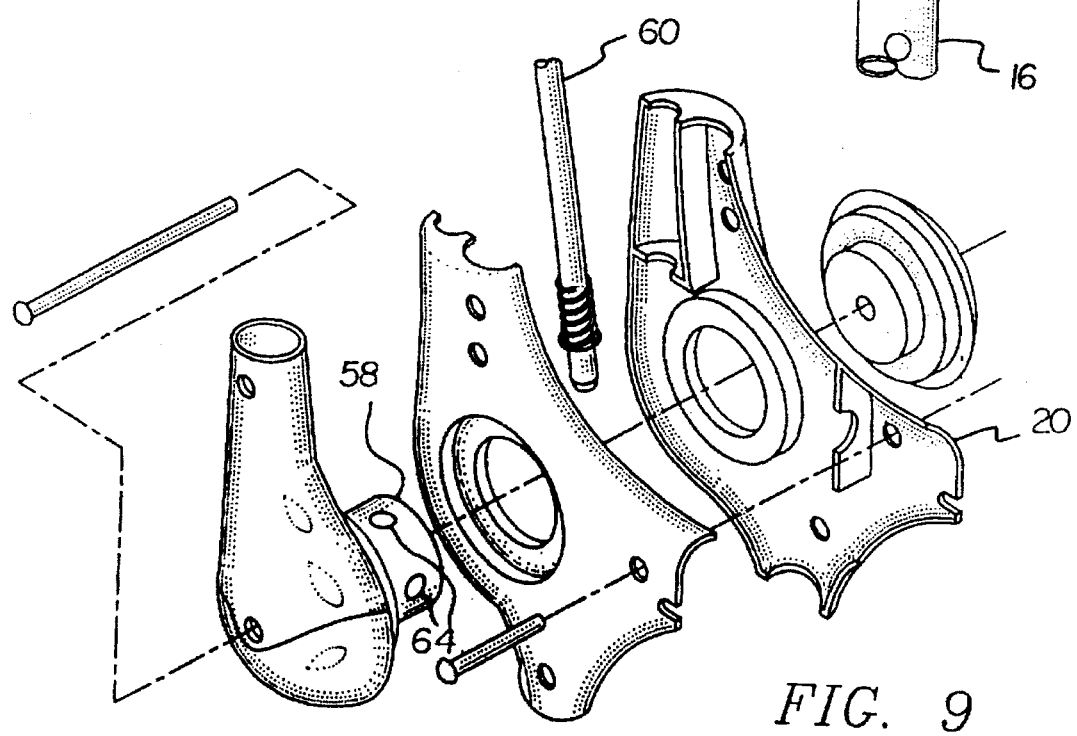
FIG. 9 is an exploded perspective view of the hinge shown in FIGS. 7 and 8.
Figure 10:
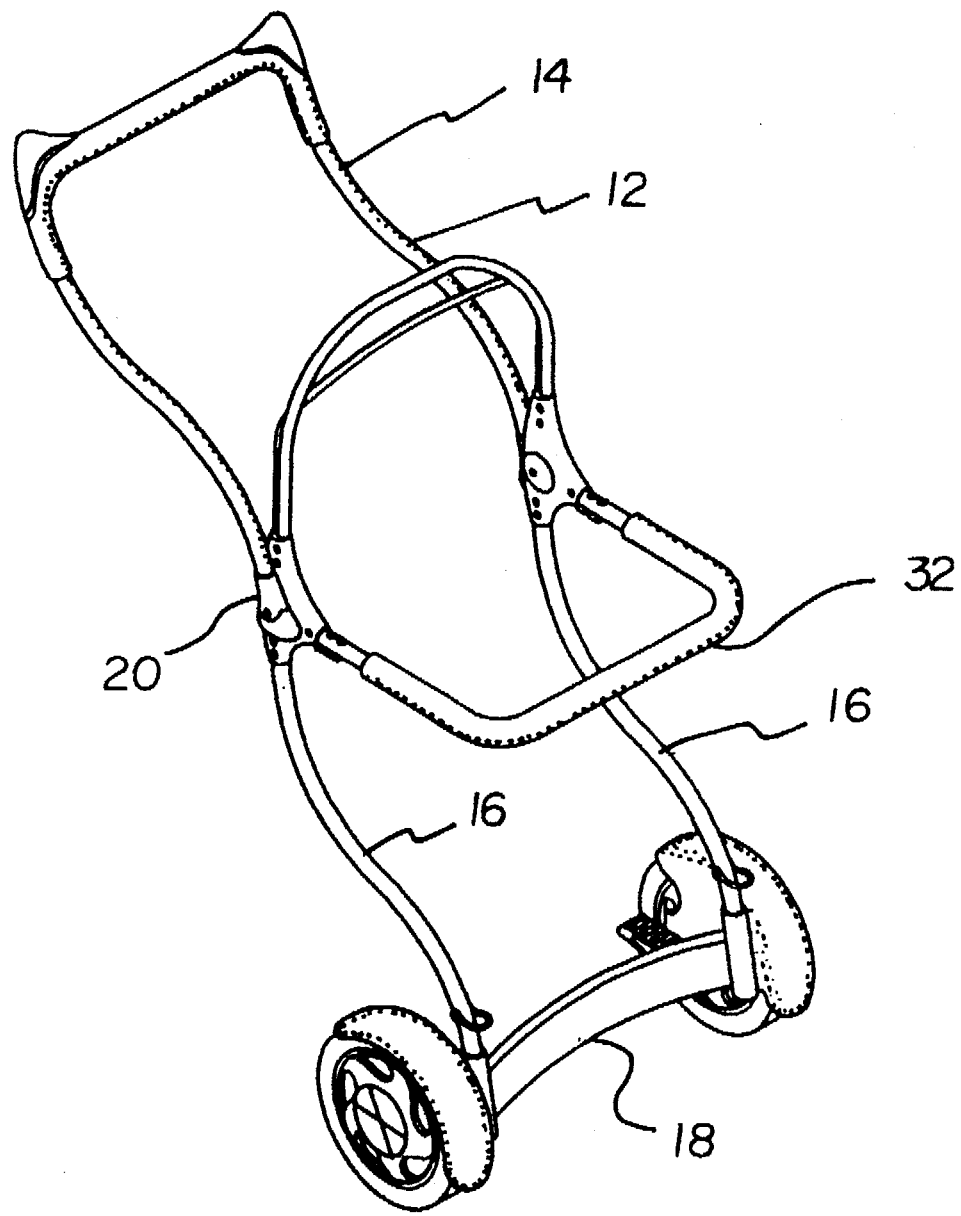
FIG. 10 is a perspective illustration of the frame utilized in association with the device of the prior Figures.

The backpack orientation of the present invention may readily be seen in FIG. 1. The stroller orientation of the present invention may readily be seen in FIG. 3. A third orientation of the present invention may readily be seen in FIG. 6. The third orientation is a simple seat orientation. In such orientation, the handle is rotater so that the top of the handle during use as a stroller is at a lowermost position on the ground. When on the ground, the handle and the two wheels form a three point support for stability. The length of the upper end of the handle is essentially the same length as the length of the rods beneath the hinge plus the height of the wheels therebeneath. As such, there are at least three recesses in each disk for receiving the rods to thereby hold the handle in any one of three orientations corresponding to the stroller position, the seat orientation and the backpack orientation, all illustrated in FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A child carrier for use as a two-wheeled stroller and as a child-supporting backpack comprising, in combination:

a frame formed of an upper handle component in an inverted U-shaped configuration and a lower component formed of two downwardly extending legs and a cross-piece coupling the legs at their lower ends with a bracket at the lower ends of the handle and the upper ends of the legs for coupling therebetween;

a fabric seat for a child having a rear face coupled to the bracket, an upwardly extending back and a pair of vertical straps forming a front;

a forwardly-extending U-shaped restraint positioned in front of a child secured at its inboard ends to the bracket supporting the upper edge of the seat;

a pair of wheels rotatably secured to the lower end of the legs;

a chest belt having a releasable buckle at a central extent secured to the frame at the lower cross-piece;

a pair of shoulder straps secured to the frame with their upper ends secured to the restraint and their lower ends secured to the frame adjacent to the cross-piece;

safety straps coupled to the child seat for securing the child in position thereon; and a disk with a plurality of radial recesses rotatably secured with respect to the bracket and an associated rod axially reciprocable through the bracket with a spring resiliently urging the rod in a direction into one of the recesses and adapted to be pulled by a user to allow rotation of the upper handle between an upper orientation wherein the device may be used as a stroller and a lower orientation wherein the device may be used as a backpack.

2. A child carrier comprising:

a frame formed of an upper handle component in an inverted U-shaped configuration and a lower component formed of two downwardly extending legs and a cross-piece coupling the legs at their lower ends with a bracket at the lower ends of the handle and the upper ends of the legs for coupling therebetween;

a fabric seat for a child having a rear face coupled to the bracket, an upwardly extending back and a pair of vertical straps forming a front;

a forwardly-extending U-shaped restraint positioned in front of a child secured at its inboard ends to the bracket supporting the upper edge of the seat;

a pair of wheels rotatably secured to the lower end of the legs; and a disk with a plurality of radial recesses rotatably secured with respect to the bracket and an associated rod axially reciprocable through the bracket with a spring resiliently urging the rod in a direction into one of the recesses and adapted to be pulled by a user to allow rotation of the upper handle.

3. The child carrier as set forth in claim 2 and further including a chest belt having a releasable buckle at a central extent secured to the frame at the lower cross-piece.

4. The child carrier as set forth in claim 2 and further including a pair of shoulder straps secured to the frame with their upper ends secured to the restraint and their lower ends secured to the frame adjacent to the cross-piece.

5. The child carrier as set forth in claim 2 and further including safety straps coupled to the child seat for securing the child in position thereon.

6. The child carrier as set forth in claim 2 wherein the length of the upper end of the handle is essentially the same length as the length of the rods beneath the hinge plus the height of the wheels therebeneath for allowing the handle to be rotated downwardly to constitute, in association with the wheels, a simple seat.

7. The child carrier as set forth in claim 6 wherein in the disk has three recesses to allow the positioning of the handle at any of three orientations for three different modes of operation of the apparatus.

* * * * *